(12) United States Patent
Cooper

(10) Patent No.: US 8,893,345 B2
(45) Date of Patent: Nov. 25, 2014

(54) CLEANING ARTICLE WITH APERTURED SHEET AND TOW FIBERS

(75) Inventor: John Thomas Cooper, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 343 days.

(21) Appl. No.: 13/416,526

(22) Filed: Mar. 9, 2012

(65) Prior Publication Data

US 2013/0232711 A1  Sep. 12, 2013

(51) Int. Cl.
 *A47L 13/16* (2006.01)

(52) U.S. Cl.
 USPC ........................................................ 15/209.1

(58) Field of Classification Search
 USPC .......................... 15/209.1–210.1, 228–229.9
 See application file for complete search history.

(56) References Cited

U.S. PATENT DOCUMENTS

| | | | |
|---|---|---|---|
| 823,725 | A | 6/1906 | Hayden et al. |
| 4,145,757 | A | 3/1979 | Bonnie |
| 4,506,404 | A | 3/1985 | Clay |
| 5,536,555 | A | 7/1996 | Zelazoski et al. |
| 5,953,784 | A | 9/1999 | Suzuki et al. |
| 6,513,184 | B1 | 2/2003 | Brown et al. |
| 6,550,092 | B1 | 4/2003 | Brown et al. |
| 6,813,801 | B2 | 11/2004 | Tanaka et al. |
| 6,963,591 | B2 | 11/2005 | Tulloch et al. |
| 6,984,615 | B2 | 1/2006 | Kenmechi et al. |
| 7,228,587 | B2 | 6/2007 | Tanaka et al. |
| 7,231,685 | B2 | 6/2007 | Tanaka et al. |
| 7,234,193 | B2 | 6/2007 | Tanaka et al. |
| 7,234,914 | B2 | 6/2007 | Usab et al. |
| 7,237,296 | B2 | 7/2007 | Tanaka et al. |
| 7,237,297 | B2 | 7/2007 | Tanaka et al. |
| 7,243,391 | B2 | 7/2007 | Tanaka et al. |
| 7,251,851 | B2 | 8/2007 | Lin et al. |
| 7,302,729 | B2 | 12/2007 | Tanaka et al. |
| 7,302,730 | B2 | 12/2007 | Tanaka et al. |
| 7,334,287 | B2 | 2/2008 | Tanaka et al. |
| 7,435,243 | B2 | 10/2008 | Miyamoto |
| 7,566,671 | B2 | 7/2009 | Hoadley et al. |
| 7,918,839 | B2 | 4/2011 | Ehrnsperger et al. |
| 2004/0016074 | A1 | 1/2004 | Tanaka |
| 2005/0198757 | A1 | 9/2005 | Gavney, Jr. et al. |
| 2006/0016036 | A1 | 1/2006 | Tanaka et al. |
| 2006/0101601 | A1 | 5/2006 | Fujiwara |
| 2007/0084006 | A1 | 4/2007 | Policicchio |
| 2010/0319152 | A1 | 12/2010 | Prizepasniak |
| 2011/0131746 | A1 | 6/2011 | Policicchio et al. |
| 2011/0154598 | A1 | 6/2011 | Yamada |
| 2011/0277258 | A1* | 11/2011 | Otsuka et al. ................ 15/209.1 |

FOREIGN PATENT DOCUMENTS

EP 0945251 A1 9/1999
JP 2011-104111 A 6/2011

OTHER PUBLICATIONS

International Search Report Dated May 23, 2013; 8 pages.
U.S. Appl. No. 13/416,334, filed Mar. 9, 2012, Policicchio.
U.S. Appl. No. 13/416,486, filed Mar. 9, 2012, Policicchio.
U.S. Appl. No. 13/416,420, filed Mar. 9, 2012, Policicchio.

* cited by examiner

*Primary Examiner* — Laura C Guidotti
(74) *Attorney, Agent, or Firm* — Larry L. Huston; Steven W. Miller

(57) ABSTRACT

A cleaning article optionally removably attachable to a handle. The cleaning article has a layer of tow fibers and a layer of sheet material, joined together in a layered construction. The sheet has apertures therethrough, so that the tow fibers may intercept the apertures. By intercepting the apertures, the tow fibers can become entangled, promoting fluffing of the tow fibers.

19 Claims, 3 Drawing Sheets

CLEANING ARTICLE WITH APERTURED SHEET AND TOW FIBERS

FIELD OF THE INVENTION

The present invention relates to cleaning articles, and more particularly to cleaning articles comprising tow fibers and the like.

BACKGROUND OF THE INVENTION

Various cleaning articles have been created for dusting and light cleaning. For example, cloth rags and paper towels used dry or wetted with polishing and cleaning compositions have been used on relatively flat surfaces. But, rags and paper towels are problematic for reasons such as hygiene (the user's hand may touch chemicals, dirt or the surface during cleaning), reach (it may be difficult to insert the user's hand with the rag or paper towel into hard-to-reach places) and inconvenience (cleaning between closely-spaced articles typically requires moving the articles).

To overcome the problems associated with using rags and paper towels, various dust gathering devices having feathers, lamb's wool, and synthetic fiber brushes have been utilized for more than a century, as illustrated by U.S. Pat. No. 823,725 issued in 1906 to Hayden. Such dust gathering devices can be expensive to manufacture, and as such are designed to be cleaned and reused. One problem associated with a reusable dust gathering device is that such dust gathering devices may not hold or trap dust very well. Soiled, reusable devices are typically cleaned via shaking or through other mechanical agitation. This process is not entirely satisfactory as it requires an extra step during, interrupting and/or following the cleaning process. Furthermore, the attempted restoration of the device may not be successful, allowing redeposition of the previously collected dust.

To address the problems experienced with reusable dust gathering devices, disposable dust gathering devices have been developed which have limited re-usability. These disposable dust gathering devices may include brush portions made of synthetic fiber bundles, called tow fibers, attached to a sheet as shown in 2010/0319152. Or the tow fibers may be attached to a plate as shown in U.S. Pat. No. 4,145,787. The disposable cleaning article may be used for one job (several square meters of surface) and discarded, or may be restored and re-used for more jobs, then discarded. Traditional cleaning articles including feather dusters, cloths, string mops, strip mops and the like, are not disposable for purposes of this invention.

Such devices may be made, for example, according to U.S. Pat. Nos. 6,813,801; 6,968,591; 6,984,615; 7,228,587; 7,231,685; 7,234,193; 7,234,914; 7,237,296; 7,237,297; 7,243,391; 7,302,729; 7,302,730; and/or 7,334,287 (having a common related application). The patents in this linage have a common feature—strips laterally extending from both sides of a generally planar article. The strips serve the purpose of increasing surface area of intermediate tow fibers by promoting deformation of the tow fibers out of the plane of the article. This approach has the attendant problem that excessive material is used for the strips. If the strips have the same length, taken from the longitudinal axis, as the tow fibers, the strips can interfere with the tow fibers fully contacting the target surface.

Another problem with a cleaning article comprising strips is that such cleaning articles are typically packaged in a flat state. To get optimum performance, a user should pre-fluff the cleaning article prior to use. Even with instructions, many users simply do not understand how to correctly perform this step. Some users do not read the instructions and entirely skip this step. Furthermore, the strips can be partially joined together due to improper cutting during manufacture, making the fluffing insufficient or more difficult. The problem of strips in such cleaning articles 10 is exacerbated in U.S. Pat. No. 5,953,784 which teaches strips extending not only from both sides of the cloth, but also from the front.

One attempt to overcome this problem is found in U.S. Pat. No. 7,566,671 which does not use laterally extending strips. However, this attempt has the drawback that the cleaning implement thereof only cleans on one side of the implement—not both sides as taught by the lineage of U.S. Pat. No. 6,813,801.

An attempt to overcome the single-sided cleaning disadvantage of the aforementioned U.S. Pat. No. 7,566,671 is found in U.S. Pat. No. 7,251,851 which teaches a spiral duster. However, this approach starts with a construction similar to that of the aforementioned U.S. Pat. No. 6,813,801 lineage and U.S. Pat. No. 823,725—leading the intended solution back to the same approach which started the problem 100 years ago.

Thus, there is a need for a cleaning article which does not require gather strips. Such cleaning article may further provide for advantageous use of the tow fibers to gather and retain dust and may also allow the user to minimize or eliminate the often overlooked or improperly performed fluffing step.

SUMMARY OF THE INVENTION

The invention comprises a cleaning article. The cleaning article is optionally removably attachable to a handle. The cleaning article comprises at least one Layer of tow fibers and at least one sheet joined together in face to face relationship. The sheet has at least one aperture therethrough for entanglement with the tow fibers.

DETAILED DESCRIPTION OF THE INVENTION

Figure 1:
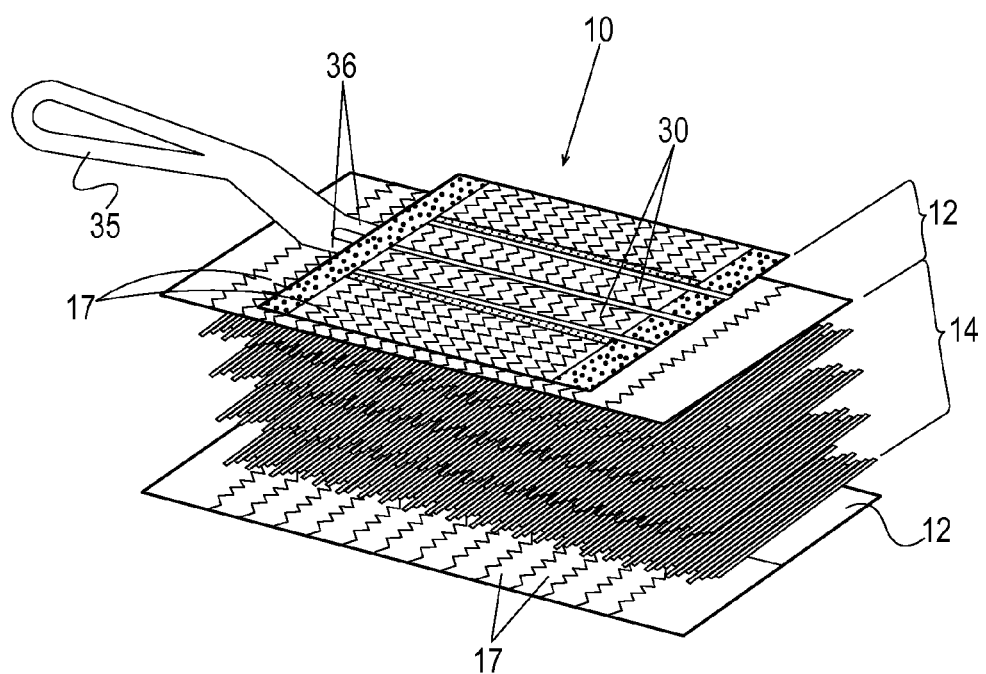
FIG. 1 is a schematic exploded perspective view of a cleaning article according to the prior art and having strips on two outer laminae.

Referring to FIG. 1, the cleaning article 10 may be generally elongate, having a longitudinal axis L, although other shapes are contemplated and feasible. The cleaning article 10 may be removably attachable to a handle 35 and/or may be used without a handle 35. A suitable handle 35 is disclosed in commonly assigned US Publication 2011/00099764.

The z-direction of the cleaning article 10 is the direction perpendicular to the sheet 12 which is typically closest to the handle 35 (if present) of the cleaning article 10, the XY plane is defined as the plane defined by the sheet 12 and is typically perpendicular to the z-direction. The cleaning article 10 may have a longitudinal axis L and a transverse axis T orthogonal thereto. The cleaning article 10, and respective components thereof, may have two longitudinal edges parallel to the longitudinal axis L and two transverse edges parallel to the transverse axis T.

The length of the cleaning article 10, etc. is taken in the longitudinal direction. The width of the cleaning article 10 corresponds to the transverse direction perpendicular to the length direction and disposed within the plane of the sheet 12. The thickness is defined as the dimension in the z-direction. The length and width of the strips shown in the art are taken in the transverse and longitudinal directions, respectively.

The cleaning article 10 may be thought of as having two, three or more laminae joined in face-to-face relationship. The laminae may comprise a tow fiber lamina 14, intermediate two laminae of generally planar sheets 12. Alternatively, a single tow fiber layer 14 may be joined to s single generally planar sheet 12. The tow fiber layer 14 is shown to comprise four layers, although one of skill will understand from one to several layers are feasible and contemplated for use with the present invention. Likewise, one, two, three or more sheets 12 are feasible and contemplated for use with the present invention.

An attachment system may provide for removable attachment of the cleaning article 10 to a suitable and optional handle 35. The cleaning article 10 attachment system and optional complementary handle 35 attachment may comprise adhesive joining, cohesive joining, mechanical engagement, etc. One common attachment system comprises sleeves 30 into which the tines 36 of the handle 35 may be inserted. The sleeves 30 may be disposed on an outer lamina.

The sheet 12 may have an outwardly facing preferential cleaning side and a second inwardly facing attachment side opposed thereto. The sheet 12 may comprise a nonwoven sheet 12. Suitable nonwovens may be made according to commonly assigned U.S. Pat. Nos. 6,797,357; 6,936,330, D489,537 and/or D499,887.

Adjacent the sheet 12 may be a compressible and/or deformable second lamina of fibers 14. The second lamina may comprise tow fibers 14. The tow fiber lamina 14 may be joined to the sheet 12 in face-to-face relationship. The tow fiber lamina 14 may be suitable for directly contacting the target surface during cleaning.

The tow fibers 14 may be synthetic. As used herein "bundle fibers" and/or "tow" refer to fibers comprising synthetic polymers including polyester, polypropylene, polyethylene and cellulose materials including cellulose acetate and mixtures thereof manufactured wherein the individual fibers are relatively long strands manufactured in bundles. The bundle fibers may be defined as any fibers having distinct end points and at least about 1 cm in length. The cleaning article 10 of the present invention may further comprise an optional absorbent core (not shown).

The sheet 12, fibrous layer 14 and non-planar structure may be joined together by thermal bonding, autogenous bonding, ultrasonic bonding, heat sealing, adhesive and/or other means known in the art. The sheet 12 may comprise two plies, joined together in face-to-face relationship. The sheet 12, fibrous layer 14 and non-planar structure 16 may be bonded in a pattern which provides a central spine 42 parallel the longitudinal axis L.

The joining of the tow fiber layer 14 and generally planar sheet 12 may be done with any combination of continuous bonds 38 and/or spot bonds 38, as known in the art. The bonds 38 may be used to create sleeves 30 for an attachment system as known in the art and discussed herein.

The bonding pattern joining the two plies may be provided in a pattern which provides a sleeve 30 complementary to and able to receive the tines 36 of the handle 35, if used with the cleaning article 10 of the present invention. Particularly, the bonding may be provided in a pattern which is generally longitudinally oriented, so that the tines 36 may be inserted into the sleeve 30 created between adjacent bonds 38.

The bond pattern may provide a continuously bonded or discretely bonded central spine 42. Outboard of the central spine 42, the bond pattern may comprise one or more continuous or discontinuous bond sites. The space between the central spine 42 bond and the outboard bonds 38 may create a sleeve 30 for receiving a tine 36 of the optional handle 35. If desired, the sheet 12 may be shrunk/strained in the cross-direction. This process can provide rugosities or wrinkles in sheet 12. The rugosities/wrinkles space apart the plies of sheet 12, allowing for easier insertion of the tines 36 into the sleeve 30, if so desired.

Figure 2:
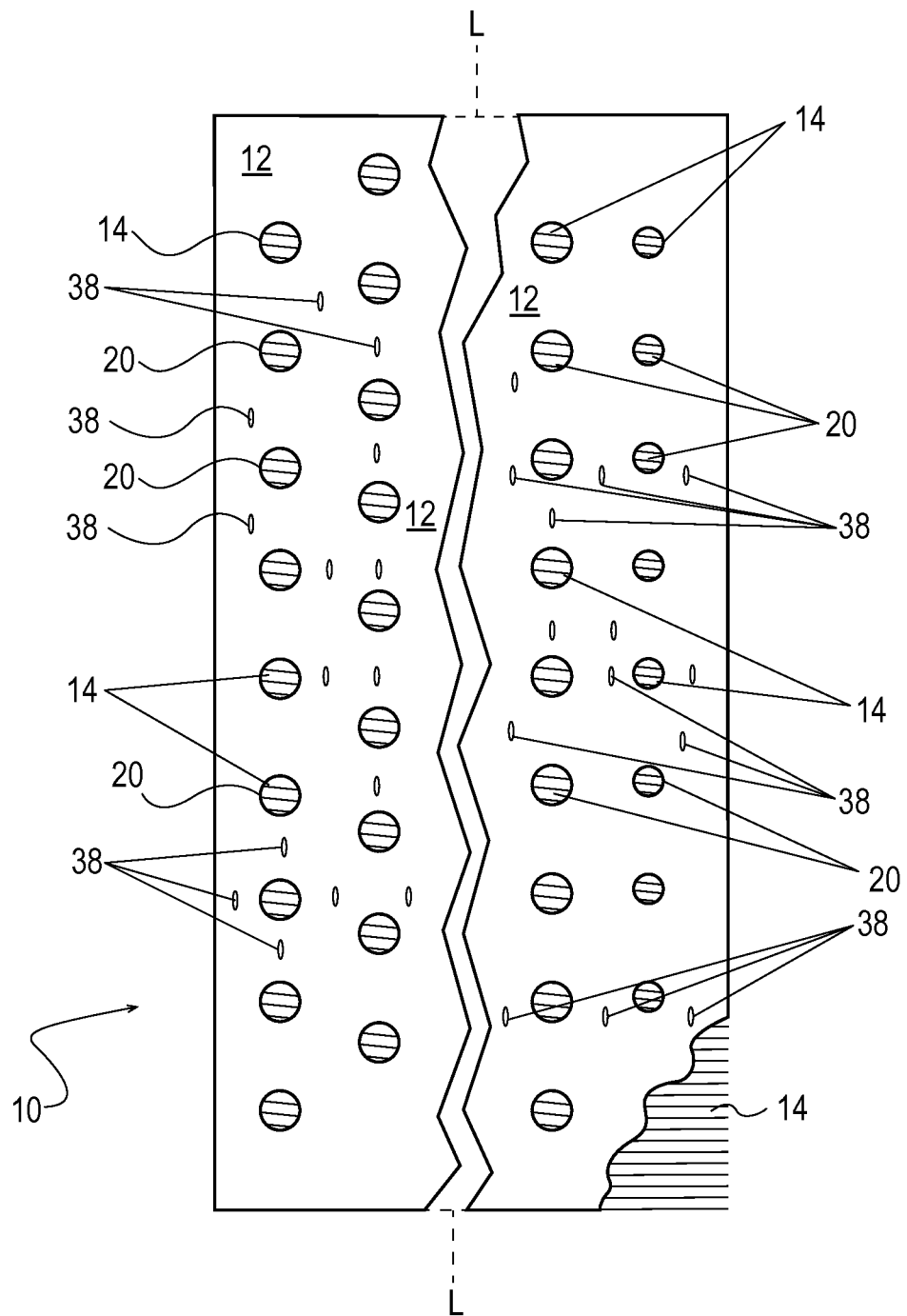
FIG. 2 is a broken top plan view of a cleaning article according to the present invention shown partially in cutaway and having identical discrete apertures on one side of the longitudinal axis and different geometry and density discrete apertures on the other side of the longitudinal axis.

Referring to FIG. 2, the cleaning article 10 comprises a generally planar sheet 12 disposed on a first face of the at least one Layer of tow fibers 14. The sheet 12 may comprise at least one discrete aperture 20. By discrete aperture 20 it is meant that a hole occurs through the material comprising the sheet 12. Thus a discrete aperture 20 does not include naturally occurring interstitials between fibers of nonwoven material forming the sheet 12.

The apertures 20 have a periphery defining the geometry of the aperture 20. The geometry includes both the size and shape of the aperture 20. For example, an aperture 20 may include holes, such as round holes, slits, and/or perforations through the sheet 12 material.

The apertures 20 may be of the same shape, and of like or different sizes. For example, the apertures 20 may be generally circular, having a diameter or diameters ranging from three to 30 mm. Or the apertures 20 may be general oval shaped, having similar or different aspect ratios, and be of like or different sizes.

Figure 3:
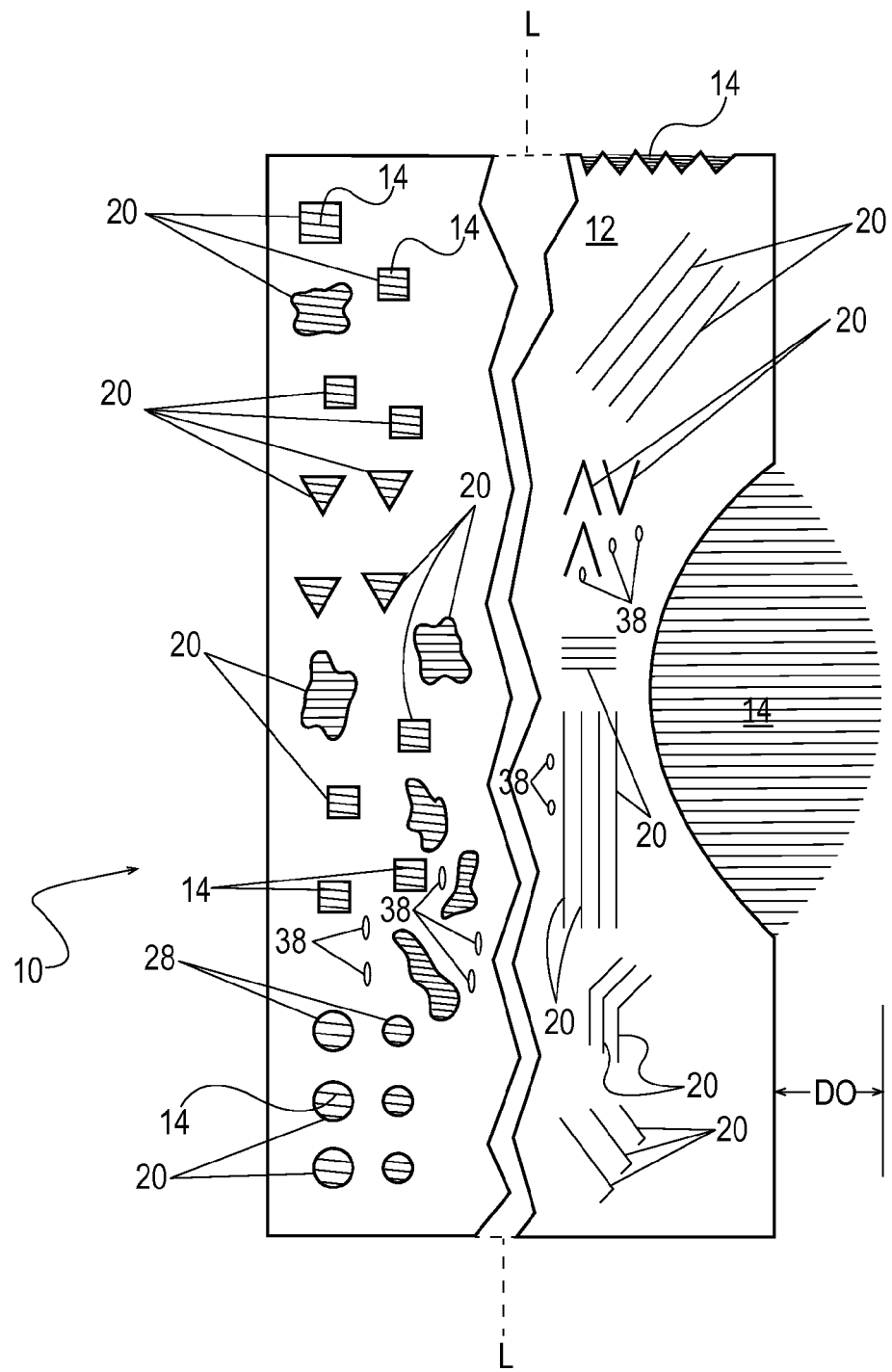
FIG. 3 is a broken top plan view of a cleaning article according to the present invention shown partially in cutaway and variable shape apertures on one side of the longitudinal axis and different slit apertures on the other side of the longitudinal axis L in combination with a sheet having a concave longitudinal edge.

Referring to FIG. 3, additionally or alternatively, the apertures 20 may be of like or different shapes. For example, one or more apertures 20 may be circular, one or more apertures 20 may be oval shaped, one or more apertures 20 may be slot shaped, one or more apertures 20 may comprise slits oriented in the same or different directions, one or may apertures 20 be square shaped, and/or one or more apertures 20 may be irregularly shaped, etc. It is believed that the different placement of the apertures 20 on the sheet 12, and/or different geometries of the apertures 20 may cause differential entanglement of the fibers in the layer of tow fibers 14.

More particularly, the perimeter of the aperture 20 may intercept one or more tow fibers, causing such tow fibers to become entangled with the aperture 20. The tow fibers may become partially disposed through one or more apertures 20. Any such entanglement, disposition or other disruption to the layer of tow fibers 14 is prophetically believed to promote fluffing of the tow fibers. Fluffing of the layer of tow fibers 14 is believed to improve cleaning and dust gathering capability of the cleaning article 10.

If desired, in a degenerate case, the cleaning article 10, the sheet 12 therefor, may be symmetric about the longitudinal axis L. That is apertures 20 of the same geometry may be disposed in the same position on each side of the longitudinal axis L, although there is no requirement for such a geometry.

The distance from the longitudinal axis L, or other distance to an aperture 20 or spot bond 38 from a starting point is measured as follows. The transverse distance is taken from and perpendicular to the longitudinal axis L. The distance is measured to the centroid of the aperture 20. For example, if the aperture 20 is circular, the distance is measured to the center of the circle. If the aperture 20 is a slit, the distance is measured to the midpoint of the slit. If the aperture 20 is irregularly shaped, the distance is measured to the centroid of such shape.

With continuing reference to FIG. 3, one or more apertures 20 may be generally elongate, having a major axis and minor axis orthogonal thereto. The major axis of such apertures 20 may be oriented parallel to the longitudinal direction, parallel to the transverse direction, in a diagonal orientation and/or any combination thereof. It is believed such different orientations will advantageously and unexpectedly produce differential fluffing of the tow fibers.

Likewise, one or more apertures 20 may be generally elongate, comprising a slit. The slit may be elongate and have no discernable area within the aperture 20. In contrast an aperture 20 having a discernable area through the sheet 12, such as occurs with a circle, may be selected.

The major axis of the apertures 20 may be oriented parallel to the longitudinal direction, parallel to the transverse direction, in a diagonal orientation and/or any combination thereof. It is believed such different orientations may advantageously produce differential fluffing of the tow fibers.

If desired, larger apertures 20 and/or apertures 20 having a greater perimeter may be disposed transversely closer to the longitudinal axis L than smaller apertures 20 and/or apertures 20 having a lesser perimeter. It is prophetically believed that by having larger apertures 20/larger perimeters closer to the longitudinal axis L, greater entanglement will occur closer to the proximal end of the tow fibers. This arrangement may advantageously provide more differential entanglement, increasing fluffing.

If desired, the apertures 20 may be interspersed among spot bonds 38 used to join the sheet 12 and the layer of tow fibers 14. By interspersed it is meant that some spot bonds 38 may be disposed further from the longitudinal axis L than some of the apertures 20 and some of the spot bonds 38 may be disposed closer to the longitudinal axis L than the apertures 20, so that some of the spot bonds 38 are dispersed around some of the apertures 20. Conversely, by interspersed it is meant that some apertures 20 may be disposed further from the longitudinal axis L than some of the spot bonds 38 and some of the apertures 20 may be disposed closer to the longitudinal axis L than some of the spot bonds 38 so that some of the spot bonds 38 are dispersed around some of the apertures 20.

If desired, the spot bonds 38 may be arranged in one or more rows. The rows of spot bonds 38 may be generally parallel to the longitudinal axis L. If desired, two or more rows of spot bonds 38 may be disposed on the same side of the longitudinal axis L. The apertures 20 may be disposed inboard of both rows, i.e. transversely closer to the longitudinal axis L, between the rows and/or outboard of both rows, i.e. further from the longitudinal axis L than the spot bonds 38, and any combination thereof.

It is prophetically believed that interspersing spot bonds 38 which fix the tow fibers with apertures 20 which entangle the tow fibers, will lead to greater differential entanglement. The greater differential entanglement may, in turn, lead to greater fluffing of the tow fibers.

If desired, two sheets 12 may be disposed in face-to-face relationship. If so the sheets 12 may be joined together to form one or more sleeves 30 to receive the tines 36 of a fork for manipulation by a user. Such sheets 12 may have like or different configurations of apertures 20. For example, the sheet 12 disposed in contacting relationship with the Layer of tow fibers 14 may have larger apertures 20 than the sheet 12 disposed away from the tow fibers.

If desired, the various cleaning articles 10 described herein may be packaged and sold in a kit. Some of the cleaning articles 10 may have sheets 12 with a particular arrangement of apertures 20, while other sheets 12 may have a different arrangement of apertures 20. This arrangement provides the benefit that the user has a choice of different cleaning articles 10 for different tasks.

One of skill will recognize that hybrids and combinations of the embodiments described above are contemplated and feasible. For example, any of the sheet s 12 described herein may be used with any of the tow fiber layers 14 described herein. A single cleaning article 10 may comprise plural sheets 12 having like or different geometries and/or plural tow fiber layers 14 having like or different geometries. Such sheets 12 and tow fiber layers 14 may be disposed next to each other, interspersed or placed in any desired configuration of layers.

Further, any of the embodiments described herein may optionally include any one of, any combination of, or all of: a sheet 12 and/or tow fiber layer 14 having differential overhang DO, a sheet 12 with apertures, an elastically contracted sheet 12 and/or a cleaning article 10 having an elastically contracted upstanding panel, as shown in commonly assigned P&G Cases 12382, 12383, 12384 and 12385, respectively. All such variant embodiments are described in these four aforementioned commonly assigned patent applications, all filed Mar. 9, 2012.

Any of the sheet 12 and/or layer of tow fibers 14 may be completely or partially coated with adhesive, wax, Newtonian or non-Newtonian oils or a combination thereof, in order to improve cleaning and increase retention of absorbed debris. If desired, the cleaning article 10 may optionally be used with a cleaning solution or other solution usable for other purposes such as treating the surface for appearance or disinfectant, etc. The cleaning solution may be pre-applied to the cleaning article 10, creating a pre-moistened cleaning article 10 or may be contained within a separate reservoir for dosing onto the cleaning article 10 and/or target surface. The cleaning solution may comprise a majority water, and at least about 0.5, 2, 5 or 10% solids, or at least about 30% or 50% aqueous solvents, non-aqueous solutions or mixtures thereof (all by weight).

Optionally the cleaning article 10 may further comprise a non-planar structure, as disclosed in commonly assigned US publication 2011/0131746 A1, filed Dec. 4, 2009. The non-planar structure may extend out of the XY plane, in the z-direction.

Referring back to FIG. 1, the cleaning article 10 may optionally further comprise gather strips 17, as known from the prior art. As used herein, gather strips 17 refer to cantilevered elements extending transversely outwardly from the longitudinal centerline of the article 10, and having a length (taken in the transverse direction) greater than the corresponding width (as taken in the longitudinal direction). The gather strips 17 lie within the XY plane as intended by manufacture, although may be deformed out of the XY plane due to fluffing before use, and/or deformations which occur in use due to movement against the target surface. The gather strips 17 may be incorporated into one of the sheets 12 described above or may be deployed on a separate sheet 12. If desired, one or more apertures 20 may be disposed on the gather strips.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A cleaning article for optional removable attachment to a handle and having a longitudinal axis defining a longitudinal length, said cleaning article comprising:
   at least one layer of tow fibers, said tow fibers extending transversely outward from proximal ends juxtaposed with said longitudinal axis to distal ends transversely remote therefrom, said layer further having first and second opposed faces;
   a generally planar sheet disposed on said first face of said at least one layer of tow fibers,
   said sheet having at least one sleeve for receiving a tine of a handle inserted into said sleeve,
   said sheet having a plurality of discrete apertures therethrough spaced apart from said distal ends of said tow fibers and
   said cleaning article optionally comprising transversely extending gather strips.

2. A cleaning article according to claim 1 wherein said cleaning article is symmetric about said longitudinal axis.

3. A cleaning article according to claim 1 wherein different apertures are disposed at different transverse distances from said longitudinal axis.

4. A cleaning article according to claim 3 comprising two sheets joined together on a common face of said layer of tow fibers and being joined together to form at least one fork sleeve to receive a fork tine therein, both of said sheets having apertures therethrough.

5. A cleaning article according to claim 1 wherein a plurality of said apertures comprise slits.

6. A cleaning article according to claim 5 comprising a plurality of transversely extending gather strips, at least one of said gather strips having an aperture therethrough.

7. A cleaning article for optional removable attachment to a handle and having a longitudinal axis defining a longitudinal length, said cleaning article comprising:
   at least one layer of tow fibers, said tow fibers extending transversely outward from proximal ends juxtaposed with said longitudinal axis to distal ends transversely remote therefrom, said layer further having first and second opposed faces; and
   a generally planar sheet disposed on said first face of said at least one layer of tow fibers, said sheet having at least one sleeve for receiving a tine of a handle inserted into said sleeve, said sheet being having a plurality of discrete apertures therethrough at least some of said apertures of said plurality being of mutually different geometries and being spaced apart from said distal ends of said tow fibers.

8. A cleaning article according to claim 7 comprising generally round apertures.

9. A cleaning article according to claim 8 comprising apertures of at least two different diameters.

10. A cleaning article according to claim 7 at least some of said apertures of said plurality are generally elongate having a major axis and a minor axis orthogonal thereto.

11. A cleaning article according to claim 10 wherein said major axes of at least some of said apertures are oriented in mutually different directions within the plane of said sheet.

12. A cleaning article according to claim 11 wherein a plurality of said apertures are oriented with major axes disposed generally perpendicular to said longitudinal axis.

13. A cleaning article according to claim 12 wherein a plurality of said apertures are oriented with major axes disposed generally parallel to said longitudinal axis.

14. A cleaning article for optional removable attachment to a handle and having a longitudinal axis defining a longitudinal length, said cleaning article comprising:
   at least one layer of tow fibers, said tow fibers extending transversely outward from proximal ends juxtaposed with said longitudinal axis to distal ends transversely remote therefrom, said layer further having first and second opposed faces; and
   a generally planar sheet disposed on said first face of said at least one layer of tow fibers,
   said sheet having at least one sleeve for receiving a tine of a handle inserted into said sleeve,
   said sheet having a plurality of discrete apertures therethrough spaced apart from said distal ends of said tow fibers and being joined to said at least one layer of tow fibers by a plurality of spot bonds, at least some of said spot bonds being offset from said longitudinal axis, at least some of said apertures and said spot bonds being interspersed at different transverse distances from said longitudinal axis.

15. A cleaning article according to claim 14 wherein said sheet and said layer of tow fibers are joined together by a plurality of spot bonds, said spot bonds having a spot bond distance from said longitudinal axis, at least some of said apertures having an aperture distance from said longitudinal axis, some of said aperture distances from said longitudinal axis being greater than some of said spot distances and some of said aperture distances from said longitudinal axis being less than said spot distances.

16. A cleaning article according to claim 15 wherein said plurality of apertures comprise apertures of at least two different sizes with at least some apertures disposed closer to said longitudinal axis being larger in size than apertures disposed further from said longitudinal axis.

17. A cleaning article according to claim 16 wherein a plurality of said spot bonds are arranged in a row, said row being generally parallel to said longitudinal axis, at least some of said apertures being disposed further from said longitudinal axis than said row of spot bonds.

18. A cleaning article according to claim 17 further comprising a second row of spot bonds, said second row being parallel to said longitudinal axis, both said rows being on the same side of the longitudinal axis, at least some of said apertures being disposed further from said longitudinal axis than both said rows of spot bonds.

19. A cleaning article according to claim 18 comprising apertures having two different shapes.

* * * * *